United States Patent [19]

Lupoli et al.

[11] Patent Number: 4,758,700
[45] Date of Patent: Jul. 19, 1988

[54] SWITCH CONSTRUCTION EMPLOYING CONTACT HAVING SPACED-APART CONTACT POINTS

[75] Inventors: Peter J. Lupoli, Hamden; Donald J. Mattis, Norwalk, both of Conn.

[73] Assignee: Casco Products Corporation, Bridgeport, Conn.

[21] Appl. No.: 50,790

[22] Filed: May 18, 1987

Related U.S. Application Data

[62] Division of Ser. No. 882,945, Jul. 7, 1986, Pat. No. 4,694,128.

[51] Int. Cl.⁴ .................................................. H01H 1/06
[52] U.S. Cl. ....................................... 200/275; 200/279
[58] Field of Search ............... 200/275, 279, 276, 239, 200/84 R

[56] References Cited

U.S. PATENT DOCUMENTS

| | | | |
|---|---|---|---|
| 1,051,245 | 1/1913 | Marchal | 24/329 |
| 1,280,222 | 10/1918 | Hester | 184/103.2 |
| 1,326,578 | 12/1919 | Curtis | 200/84 R |
| 1,643,238 | 9/1927 | Curtis | 200/84 |
| 1,768,446 | 6/1930 | Gron | 200/84 |
| 1,911,811 | 5/1933 | Coote | 200/84 |
| 2,252,962 | 8/1941 | Carlson | 137/104 |
| 2,253,260 | 8/1941 | Alcorn | 200/84 |
| 2,479,503 | 8/1949 | Moore | 200/84 |
| 2,520,237 | 8/1950 | Cleary | 200/84 |
| 2,613,293 | 10/1952 | Marks | 200/84 |
| 2,794,888 | 6/1957 | Morse | 200/275 |
| 2,965,888 | 12/1960 | Johnston et al. | 340/244 |
| 2,985,187 | 5/1961 | Hamilton | 137/242 |
| 3,014,205 | 12/1961 | Boehm | 340/214 |
| 3,055,220 | 9/1962 | Ryan et al. | 73/446 |
| 3,185,789 | 5/1965 | Gunther | 200/84 |
| 3,204,230 | 8/1965 | Hosford, Jr. | 340/244 |
| 3,246,517 | 4/1966 | Malkiewicz | 73/308 |
| 3,258,968 | 7/1966 | Woodcock | 73/308 |
| 3,283,108 | 11/1966 | Collier | 200/275 |
| 3,409,750 | 11/1968 | Hathaway | 200/84 |
| 3,471,665 | 10/1969 | Sargent | 200/84 |
| 3,603,925 | 9/1971 | Hughes et al. | 340/59 |
| 3,605,086 | 9/1971 | Triska | 340/59 |
| 3,633,193 | 1/1972 | Milo | 340/244 A |
| 3,657,499 | 4/1972 | Gawlick et al. | 200/265 |
| 3,750,124 | 7/1973 | Barnes et al. | 340/244 E |
| 3,774,187 | 11/1973 | Windham | 340/243 |
| 3,857,008 | 12/1974 | Van Der Donk | 200/275 |
| 3,890,478 | 6/1975 | Riddel | 200/84 R |
| 3,939,470 | 2/1976 | Arai et al. | 340/59 |
| 4,139,750 | 2/1979 | Rau | 200/84 R |
| 4,248,088 | 2/1981 | McGown et al. | 73/319 |
| 4,308,725 | 1/1982 | Chiyoda | 62/129 |
| 4,386,337 | 5/1983 | Todd | 340/59 |
| 4,467,156 | 8/1984 | Dvorak et al. | 200/84 R |
| 4,671,121 | 6/1987 | Schieler | 73/313 |

Primary Examiner—Renee S. Luebke
Attorney, Agent, or Firm—Mitchell D. Bittman

[57] ABSTRACT

A float switch construction for monitoring liquid levels, comprising a float housing having a float member which is movable therein between raised and lowered positions. In the housing there is a fixed contact member and an asymmetric, elongate movable contact member, the latter having a laterally offset portion constituting a gravity-responsive mass. The housing has an electrically conductive bearing which mounts the movable contact member for both turning and pivotal movement and for conducting current to or from it. The float member and movable contact member are freely turnable with respect to one another, and have cooperable engaging portions for causing the movable contact member to pivot in response to movement of the float member. The fixed contact member has contact portions disposed annularly for engagement by the movable contact member in response to its pivotal movement irrespective of the angular orientation of the float housing. Engagement of the contact members controls a circuit from the fixed contact member to the bearing.

2 Claims, 2 Drawing Sheets

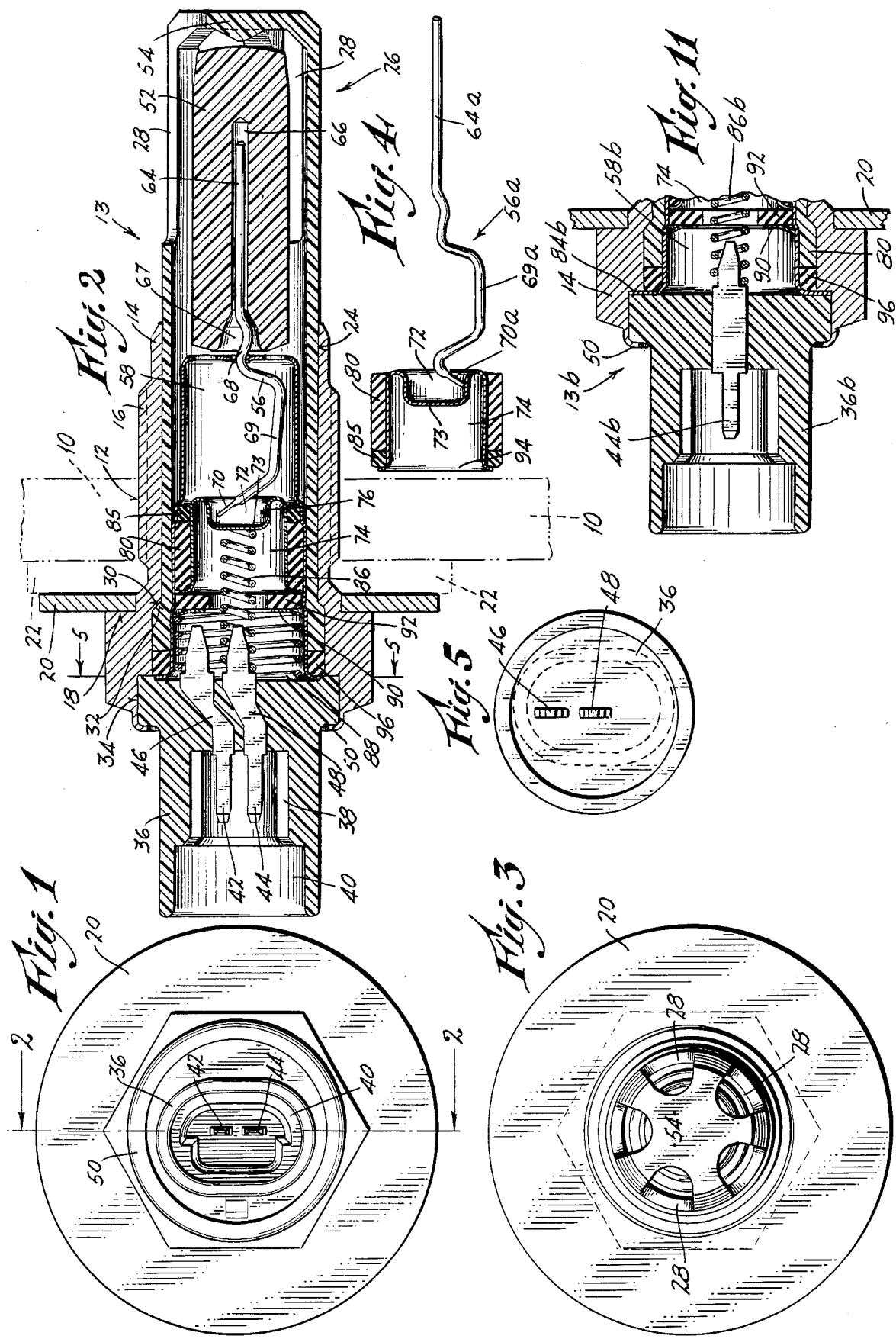

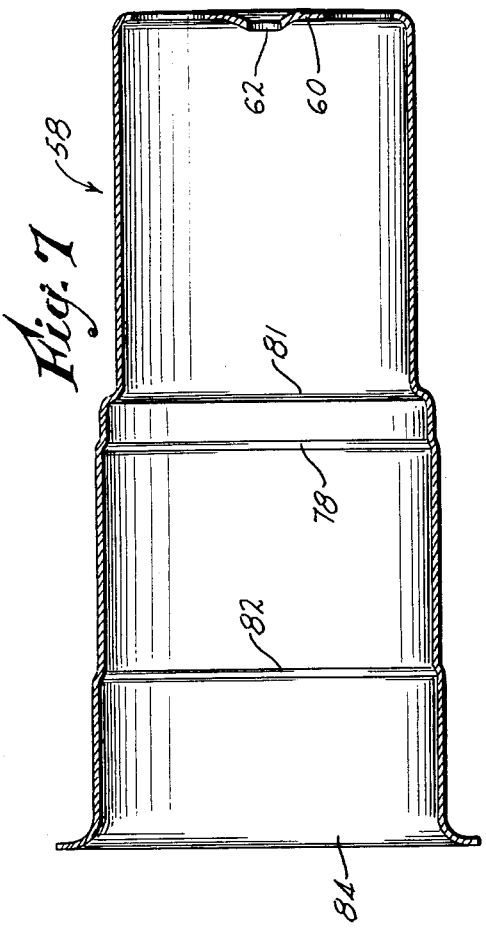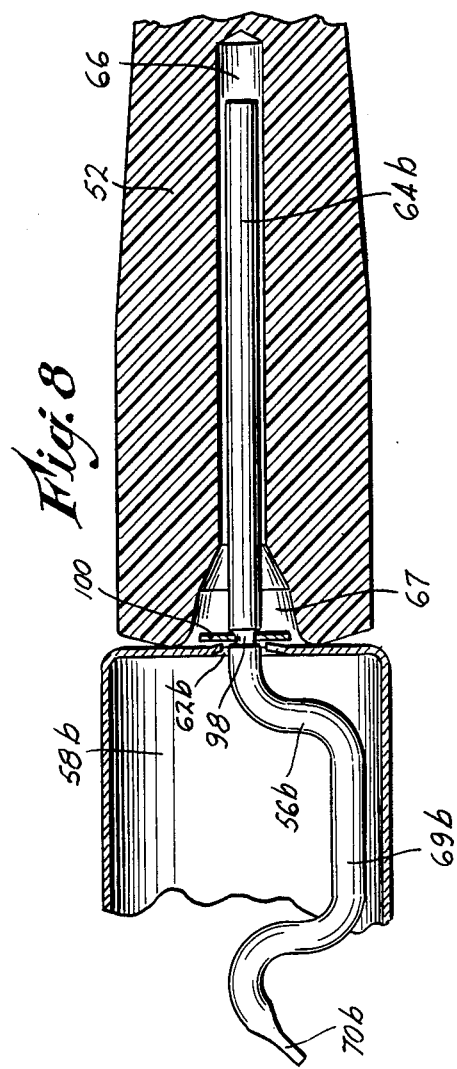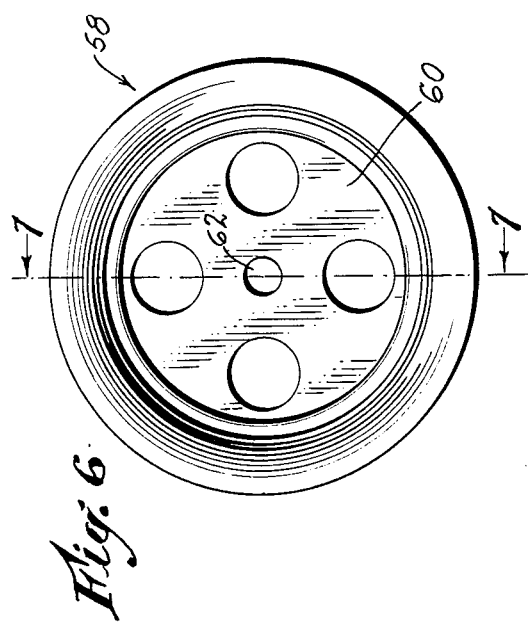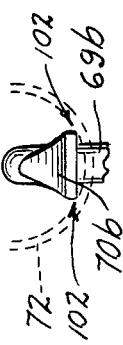

SWITCH CONSTRUCTION EMPLOYING CONTACT HAVING SPACED-APART CONTACT POINTS

STATEMENT AS TO RIGHTS TO INVENTIONS MADE UNDER FEDERALLY SPONSORED RESEARCH AND DEVELOPMENT

Research and development of the present invention and application have not been Federally-sponsored, and no rights are given under any Federal program.

This is a division of application Ser. No. 882,945, filed July 7, 1986, now U.S. Pat. No. 4,694,128.

BACKGROUND OF THE INVENTION

1. Field of the Invention

This invention relates to float switches, and more particularly to devices of this type wherein an enclosed buoyant float member is immersed in a liquid to be gauged or monitored, and wherein movement of the member effects the opening or closing of electrical contacts disposed within the float switch housing.

2. Description of the Related Art Including Information Disclosed Under 37 CFR §§1.97–1.99

U.S. Pat. No. 3,750,124 dated July 31, 1973, issued to C. Barnes and entitled FLUID LEVEL SWITCH, illustrates a level indicator employing a float switch housing of the type adapted to be mounted in a vertical wall of a vessel such as a master cylinder, for example, and wherein a sealed magnetic-responsive reed switch is disposed in a wall of the housing. A float carrying a permanent magnet is captive in the housing, and rises or falls according to changes in the level of the liquid being monitored. As the magnet approaches the reed switch the latter is actuated, and the change is detected by a transistor amplifier stage that is arranged to illuminate an indicator lamp.

One problem with this patented construction was the necessity to accurately position the switch housing in the wall of the tank or vessel in such a way that the path of movement of the float was always along a vertical plane. This requirement constituted a distinct drawback, since the interior of the tank or vessel was often not accessible, and accordingly care had to be exercised when installing such devices.

Another float switch construction is illustrated in U.S. Pat. No. 4,467,156 dated Aug. 21, 1984, issued to D. Dvorak, and entitled LIQUID LEVEL SENSOR SWITCH. This patented device comprises a float switch housing in which there is captive a float containing an embedded contact strip. The extremities of the strip project from the float at its opposite ends. Because the strip is disposed laterally of the longitudinal axis of symmetry of the float, the latter always automatically assumes a rotary position wherein the projecting parts of the contact strip face downwardly so as to be capable of simultaneous contact on the one hand with the electrically grounded float housing and on the other hand, the inner surface of an insulated contact cup mounted in the housing. Such an arrangement does not rely upon a particular angular orientation of the switch housing for its operation. As soon as the float becomes immersed, it automatically rotates to the desired, operative position shown in FIG. 1 of the patent.

A problem with this latter patented arrangement resides in the fact that one portion of the circuit comprises the ground path provided by the wall of the vessel on which the switch is mounted. In many instances, the vessel wall does not, in fact, constitute a "good" electrical ground, that is, one which is of low impedance and relatively free of noise originating at other electrical equipment, or free of circulating ground currents. Problems with poor grounds and/or ground currents are notorious in the electronics field, and are particularly troublesome where sensitive electronic equipment is being employed. The situation is aggravated where electrical components or sub-systems are intended for use on recent model automotive vehicles of the type incorporating "on-board computers" that continuously monitor a wide variety of vehicle functions and provide the vehicle operator with information relating thereto.

SUMMARY OF THE INVENTION

The above disadvantages and drawbacks of prior switch devices are obviated by the present invention which has for one object the provision of a novel and improved switch construction which is especially simple in its structure and which is completely operational regardless of the mounting position or angular orientation of the switch housing in the environment with which the device is intended to be used.

Another object of the invention is to provide an improved switch construction as above set forth, which is especially easy to install and which is rugged and reliable over extended periods of use.

Still another object of the invention is to provide an improved switch construction as above characterized, wherein the parts can be economically fabricated and easily assembled, thereby keeping the overall manufacturing cost low.

Yet another object of the invention is to provide an improved switch construction of the kind indicated, wherein there is maintained complete isolation of the switching circuit with respect to ground, thus minimizing the need for external isolation devices or other electrical components; there are thus eliminated problems involving interference from sources such as "ground currents" and the like. This feature is considered to be significant where the switch is installed on an automotive vehicle, and where sensitive electronic circuitry, such as an "onboard computer", is being employed to monitor or receive signals from the switch.

The above objects are accomplished by a switch construction, comprising in combination a switch housing having within it a first, stationary contact comprising an annular contact surface extending about an axis, and a second contact cooperable with said first contact, said second contact being turnably movable in the housing and comprising a wire-like member having a tip disposed angularly with respect to the axis of the annular contact surface. The tip has a flattened end portion, so as to provide two spaced-apart contact points adapted to engage spaced apart contact areas of the annular contact surface when the tip is brought into engagement therewith. The arrangement is such that the engagement of the contact points with the spaced apart areas of the annular contact surface provides stability to the second contact and minimizes its tendency to wobble.

Other features and advantages will hereinafter appear.

BRIEF DESCRIPTION OF THE DRAWINGS

FIG. 1 is a left end elevation of the improved float switch construction of the present invention, adapted to be mounted in a vertical wall of a tank or vessel containing liquid to be gauged.

FIG. 2 is an axial vertical section of the float switch construction of FIG. 1, taken on the line 2—2 thereof.

FIG. 3 is a right end elevation of the float switch construction of FIGS. 1 and 2.

FIG. 4 is a vertical section of a modified contact arrangement adapted to be substituted for that shown in FIG. 2, this construction constituting another embodiment of the invention.

FIG. 5 is an inside end elevation of an insulating bushing of the float switch construction, looking in the direction indicated by the arrows on the line 5—5 of FIG. 2.

FIG. 6 is a right end elevation, enlarged, of a bearing and contact cup employed with the float switch construction of FIGS. 1-3 and 5.

FIG. 7 is a section taken on the line 7—7 of FIG. 6.

FIG. 8 is a fragmentary axial, vertical section of a modified contact and bearing arrangement adapted to be substituted for that shown in FIG. 2, this construction constituting still another embodiment of the invention.

FIG. 9 is a top plan view of a retainer "E" washer employed with the contact and bearing arrangement of FIG. 8.

FIG. 10 is a left end fragmentary elevational view of the contact member of the switch construction of FIG. 8, with relation to its annular cooperable contact, and FIG. 11 is a fragmentary axial vertical section of a somewhat modified construction, constituting yet another embodiment of the invention.

DESCRIPTION OF THE PREFERRED EMBODIMENT

FIG. 2 illustrates a vertical wall 10 of a tank or vessel, such as the crankcase of an automotive internal combustion engine, the wall 10 having a threaded aperture 12 adapted to receive the improved float switch construction 13. The switch construction 13 comprises a metal bushing 14 having external threads 16 adapted to mate with the threads of the aperture 12 in the wall 10. The bushing 14 has an annular shoulder 18 which bears against a pressure washer 20 and a resilient sealing washer 22 whereby a leakproof seal is provided between the vessel wall 10 and the bushing 14. The latter has an elongate bore 24 in which there is displaced an elongate float housing 26 having a series of apertures 28 at one end, to permit liquid to enter the interior thereof. The bore 24 has a conical shoulder 30 that is engaged by a corresponding conical shoulder 32 on the housing, and the parts are telescopically received one in the other as shown in FIG. 2. The outer end of the bushing 14 has a large cylindrical recess 34 which receives an insulating bushing or terminal block 36 having a bore 38 and counterbore 40. Two electrically conductive terminals 42, 44 are embedded in the insulating bushing 36, having external prongs adapted for connection to a suitable electrical receptacle (not shown), and laterally offset portions 46, 48 respectively, extending into the interior of the housing 26, for engagement by a pair of conductor springs. A laid-over flange 50 on the bushing secures the terminal block 36 in position.

A buoyant float member 52 is disposed in the housing 26 at the inner end thereof. The member 52 is continuously exposed to liquid contained in the vessel, and can rise and fall with changes in the level thereof but is held captive therein by the end wall 54 of the housing, FIGS. 2 and 3.

In accordance with the present invention there is provided a novel and improved contactor arrangement disposed in the housing 26 whereby a fixed contact having annular or generally circularly disposed contact surfaces are engaged by a movable contact member 56 which latter is mounted for both pivotal and turning movement with respect to the housing 26, and which corresponds to changes in the position of the float member 52 resulting from a rise or fall in the liquid being monitored. The movable contact member 56 is asymmetrical, that is, it has a laterally offset portion constituting a gravity-responsive mass such that it will turn in the housing 26 and always assumes a fixed rotative position with respect to a vertical plane, irrespective of and unrelated to the angular orientation of the float housing 26.

In accomplishing the novel combined pivotal and turnable mounting for the movable contact member 56, there is provided in the housing a stepped cup 58, particularly shown in FIGS. 6 and 7, having an apertured bottom wall 60. The contact member 56 is wire-like and relatively loosely held in the central aperture 62, whereby binding between the member 56 and the walls of the aperture 62 is eliminated.

As shown, the contact member 56 has an essentially straight end portion 64 that extends into a bore 66 of the float member 52 with a relatively loose fit whereby relative turning of the two parts can occur freely. The outer end or mouth 67 of the bore 66 is flared to provide clearance for the member 56. It can be seen that in the vicinity of the aperture 62, the member has a slight reverse bend 68, of a configuration similar to the letter "S", which minimizes any tendency for the member 56 to shift in directions parallel to its axis. According to the invention, the member 56 has a laterally offset portion 69 adjacent its exposed end, constituting the gravity-responsive mass that is disposed laterally of the axis of the member (and also laterally of the axis of the housing 26). At the extremity of the member 56 there is a contact surface or tip 70 adapted to engage the wall of a cup-like recess 72 in the bottom wall 73 of a fixed contact member 74, FIGS. 2 and 4, insulatedly mounted in the housing 26. The fixed contact member 74 is preferably a drawn metal part, having a continuous inner annular contact surface 76 comprising multiple contact points adapted to be engaged by the contact tip 70 of the movable contact member 56.

The fixed contact member 74 is positioned inside the stepped cup 58 by one of the shoulders 78 thereof, and is held in spaced relation with the walls of the stepped cup by an insulating sleeve 80. The fixed contact member 74 is thus electrically insulated from the cup 58, which has additional annular shoulders 81 and 82 and an outwardly flared lip or curl 84.

A seal is provided by an O-ring 85 located between the fixed contact member 74 and stepped cup 58, at the location of the shoulders 78, 81. The O-ring 85 functions to prevent liquid from entering the area around the spacer sleeve 80 and beyond, in FIG. 2. The outwardly flared lip 94 (FIG. 4) of the cup 74 bears against the sleeve 80.

Referring again to FIG. 2, the inner end portions 46, 48 of the terminal prongs 42, 44 respectively project into the interior of the housing 26, and are shouldered to provide seats for inner and outer compression springs 86, 88. One end of the inner spring 86 thus establishes electrical contact with the terminal prong 44, and the opposite end of the spring 86 is seated against the inside of the bottom wall 73 of the fixed contact member 74, establishing electrical contact therewith.

One end of the outer spring 88 engages the terminal prong 42, being thereby electrically connected thereto, and the other spring end engages a metal facing washer 90 which is pressed into the stepped cup 58 against an insulating washer 92, the latter to provide electrical isolation between a flared lip 94 of the contact member 74 and the stepped cup 58. The insulating washer 92 is thus sandwiched between the facing washer 90 and the flared lip 94. An additional O-ring 96 is provided at the location of the flared lip 84 of the stepped cup 58, to insulate the latter from the metal bushing 14 and to provide a seal between the bore of the bushing 14 and the outer surface of the housing 26, thereby to prevent leakage past this area.

By the present invention the engagement of the movable contact member 56 with the walls of the central aperture 62 in the stepped cup 58 is such as to permit both pivotal and rotational or turning movement of the member 56 with respect to the cup 58 and housing 26. In addition, the loose fit between the float member 52 and contact member 56 does not restrict free turning of the latter in relation to the float member 52. As a consequence, when the float construction is initially installed in a tank or vessel, the offset portion 69 of the contact member 56, constituting the gravity-responsive mass, functions to always orient the member 56 to the position shown in FIG. 2; that is, the offset portion is hanging suspended so to speak with respect to the axis defined by the straight portion 64 that extends loosely into the float member bore 66. The exposed extremity of the contact member 56 containing the contact tip 70 is seen to point angularly upward and to the left in FIG. 2, irrespective of the angular orientation of the float housing 26. Thus, when the liquid level rises, causing upward movement of the float member, the movable contact 56 pivots in the bearing aperture 62 in a counterclockwise direction and no engagement with the contact surfaces 76 of the fixed contact member 74 occurs. However, with a fall in liquid level, the contact member 56 pivots clockwise in the bearing aperture 62, causing the contact tip 70 to mechanically engage and electrically contact the surface 76.

In tests performed with actual models, the ability of the movable contact member 56 to function in the above described manner has been demonstrated, even in the absence of vibration or other sudden movements of the float switch construction as would be encountered in an internal combustion engine crankcase. Such vibration would assist the movable contact in assuming the desired, upright position.

It is to be understood that the device of the present invention is not intended to monitor crankcase oil level when the engine is operating; instead, readings would be taken at the time that the ignition key was inserted, or after the vehicle was shut down, etc.

Another embodiment of the invention is shown in FIG. 4, wherein like reference numerals have been assigned to components that are of the same construction as in the first embodiment. By the invention a modified movable contact member 56a having an actuator portion 64a and gravity influenced portion 69a is associated with the fixed contact member 74. The modified contact member 56a can be employed with the bearing cup 58 and float member 52 of the previously described mechanism, as will be understood. In FIG. 4, the end portion of the contact member 56a, containing the contact tip 70a, is disposed at a downwardly extending angle with respect to the axis of the member.

With such a construction, electrical continuity would be established between the two contact members 56a, 74 when liquid levels were high, and interruption in the continuity would occur when the level fell, causing the float member 52 to drop and pivot the movable member 56a clockwise in FIG. 4. Stated differently, the arrangement of FIG. 4 would normally provide a closed circuit between the switch terminals 42, 44 of FIG. 2 when the liquid level is above a certain point, whereas the arrangement shown in FIG. 2 provides an open circuit under this condition, and a closed circuit under conditions of falling levels. In other respects, the operation of the arrangement of FIG. 4 is similar to that of the previously described construction. The offset portion 69a of the movable contact member 56a constitutes the gravity-responsive mass or weighted portion of the member, causing it to assume the position shown irrespective of the angular positioning or orientation of the float housing 26, following installation.

Still another embodiment of the invention is shown in FIGS. 8 and 9, illustrating a modification involving a movable contact member 56b having a contact tip 70b, gravity-influenced portion 69b and actuator portion 64b, a bearing cup 58b, and the float member 52. By the invention, the diameter of the member 56b where it passes through the bearing aperture 62b is slightly less than the diameter of the aperture, so as to permit both pivotal and turning movement, as before. There is provided in the contact member 56b, an annular groove 98 which is adapted to receive a resilient "E" washer 100, FIG. 9. The washer 100 minimizes the tendency for axial shifting of the member 56b to occur. Again, the mouth 67 of the bore 66 of the float member 52 is of enlarged diameter to provide clearance for the washer 100. The walls of the mouth 67 can optionally be provided with a slight outward drift, as shown in FIG. 8. The operation of this embodiment is similar to that of the embodiment of FIG. 4, wherein counterclockwise movement of the contact member 56b in FIG. 8 gives rise to establishment of electrical continuity between the terminal prongs 42, 44 of the switch construction, with clockwise movement of the member interrupting such continuity.

The flattened contact tip 70b as shown in FIG. 10 is adapted to engage the cooperable annular contact portion 72 of the fixed contact member 74 at two spaced-apart places 102 which has the double benefit of providing relatively high-pressure point contacts and also stabilizing the wire contact member 56b at such times that contact is established between the members. The contact tip is disposed obliquely with respect to the axis of the annular contact portion 72; for example, a 45° angle between the tip 70b and axis has been found to provide satisfactory results, although other dispositions could be employed with equally good or possible better results. The width of the flattened portion exceeds the wire diameter, while the thickness is less than such diameter. For example, with a wire diameter of 0.054 inch, the width of the flat can be 0.100 inch. The stabilizing effect of the double contact points minimizes any tendency for wobbling of the contact member to occur, and accordingly there results a more reliable electrical contact.

It will be understood that the tip portion 70 of the embodiment of FIG. 1 can preferably incorporate a flattened configuration similar to that of the embodiment of FIGS. 8–10. The noted advantages of a double contact point are thus realized, namely improved stability of the contact member 56.

Complete isolation of the switch circuit from ground can be provided, such that no interference from ground currents can occur; as a result, the unit can be especially well adapted for use with the "on-board computers" currently being employed on recent model vehicles.

Yet another embodiment of the invention is shown in FIG. 11, illustrating a modified float switch construction 13b similar to that designated 13 in FIG. 2 except that a single terminal 44b is employed, and electrical contact between this terminal and the threaded bushing 14 is made or broken in response to changes in the level of the liquid being gauged.

By the invention the stepped cup 58b is provided with an enlarged lip 84b, such that the cup 58b is in continuous electrical contact with the bushing 14, which is normally at electrical ground potential. In establishing such contact, a somewhat modified terminal block 36b is employed, having the single centrally disposed terminal 44b which engages a spring 86b, as before. The second terminal 42 has been omitted, as well as the spring 88. The terminal 44b is preferably centrally disposed with respect to the block 36b, and is adapted to receive a suitable connector (not shown) having a single electrical circuit. The flange or lip 84b is thus sandwiched between the block 36b and the shoulder of the bushing 14, with the block 36b being held in position by the laid-over flange 50 as in the previous construction. In operation, the modified construction is substantially the same, except that electrical contact between the terminal 44b and bushing 14 is made or broken with changes in the level of liquid being gauged. This "single ended" arrangement has the advantage that only one lead is required on the connector extending from the terminal 44b. However, it does not have the advantage of isolation from spurious signals arising from ground currents, as does the construction of the first embodiment. If immunity from such ground currents is not considered essential, it is believed that the single ended arrangement as illustrated and described would suffice for many applications.

From the above it can be seen that we have provided novel and improved float switch constructions that are extremely simple in their structure, rugged and reliable in use, and which are adaptable to a large variety of installations, especially those where the switch must function with its housing in different angular positions. The parts can be readily fabricated, mostly as drawn metal pieces or alternately molded components, perhaps with the exception of the bushing, where machining operations would be required.

The disclosed devices are thus seen to represent a distinct advance and improvement in the field of float switches.

Variations and modifications are possible without departing from the spirit of the invention.

Each and every one of the appended claims defines an aspect of the invention which is separate and distinct from all others, and accordingly each claim is intended to be treated as such when examined in the light of the prior art devices in any determination of novelty or validity.

What is claimed is:

1. A switch construction, comprising in combination:
    (a) a switch housing having within it a first, stationary contact comprising an annular concave contact surface extending about an axis,
    (b) a second contact permanently mounted in said housing and cooperable with said first contact, said second contact being turnably movable and comprising an elongate wire-like member having intermediate its ends a pivotal bearing portion, and having at one end a tip disposed angularly with respect to the axis of said annular contact surface,
    (c) said tip having a flattened end portion providing two spaced-apart contact points adapted to engage spaced-apart contact areas of said annular contact surface when the tip is brought into engagement therewith,
    (d) the engagement of said spaced-apart contact points with the spaced apart-areas of said annular contact surface providing stability to the said second contact and minimizing its tendency to wobble, and
    (e) means carried by said housing, providing a pivotal bearing engaging the pivotal bearing portion of said wire-like member to enable the latter to have simultaneous pivotal and turning movement with respect to the housing.
2. The invention as set forth in claim 1, wherein:
    (a) said tip is disposed at roughly 45° with respect to the axis of said annular surface of the first contact.

* * * * *